United States Patent
Dowe

(10) Patent No.: US 6,325,554 B1
(45) Date of Patent: Dec. 4, 2001

(54) CAMERA WITH ELECTROSTATIC LIGHT VALVE THAT FUNCTIONS AS IMAGE REFLECTING MIRROR FOR VIEWFINDER

(75) Inventor: David R. Dowe, Holley, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/526,190

(22) Filed: Mar. 15, 2000

(51) Int. Cl.$^7$ .............................. G03B 19/12; G02F 1/03
(52) U.S. Cl. .................... 396/358; 396/249; 396/355; 359/254
(58) Field of Search .................... 354/106, 105, 354/127, 128, 107, 109; 359/254, 230, 291; 396/249, 354, 355, 356, 358

(56) References Cited

U.S. PATENT DOCUMENTS

| | | |
|---|---|---|
| 3,682,058 | 8/1972 | Wada . |
| 3,683,776 | 8/1972 | Ono . |
| 3,989,357 | * 11/1976 | Kalt ........................................ 359/231 |
| 4,234,245 | 11/1980 | Toda et al. . |
| 4,248,501 | 2/1981 | Simpson . |
| 4,322,153 | 3/1982 | Katayama et al. . |
| 4,362,369 | * 12/1982 | Kazami et al. ...................... 354/106 |
| 4,561,744 | 12/1985 | Rietbrock et al. . |
| 4,584,056 | 4/1986 | Perret et al. . |
| 4,704,707 | 11/1987 | Simpson . |
| 4,763,142 | 8/1988 | Saitoh et al. . |
| 5,032,005 | 7/1991 | Woodruff . |
| 5,233,459 | 8/1993 | Bozler et al. . |
| 5,459,602 | 10/1995 | Sampsell . |
| 5,499,070 | 3/1996 | Miura . |
| 5,519,240 | 5/1996 | Suzuki . |
| 5,552,925 | 9/1996 | Worley . |
| 5,579,149 | 11/1996 | Moret et al. . |
| 5,646,770 | 7/1997 | Sato et al. . |
| 5,739,942 | 4/1998 | Furlani et al. . |
| 5,781,331 | 7/1998 | Carr et al. . |
| 5,784,189 | 7/1998 | Bozler et al. . |

* cited by examiner

*Primary Examiner*—Georgia Epps
*Assistant Examiner*—Tuyen Tra
(74) *Attorney, Agent, or Firm*—Roger A. Fields

(57) ABSTRACT

A camera has an objective lens for forming an image of a subject by focusing rays of light on a film plane, and a mirror for a viewfinder which is movable in the way of the light rays between the objective lens and the film plane to reflect the light rays to a viewing screen in the viewfinder and is movable out of the way of the light rays to allow the lens to focus the light rays on the film plane. The movable mirror is an electrostatic light valve that includes a transparent flat stationary electrode between the objective lens and the film plane, and a coilable mirrored resilient electrode having one end fixed with respect to the stationary electrode and a free end. The coilable electrode is biased to curl into a coil on the stationary electrode, beginning at the free end, to move out of the way of the light rays, and is electrostatically actuatable to uncurl from the coil along the stationary electrode to be in the way of the light rays to reflect them to the viewing screen.

9 Claims, 3 Drawing Sheets

US 6,325,554 B1

CAMERA WITH ELECTROSTATIC LIGHT VALVE THAT FUNCTIONS AS IMAGE REFLECTING MIRROR FOR VIEWFINDER

CROSS REFERENCE TO RELATED APPLICATIONS

Reference is made to commonly assigned copending applications Ser. No. 09/526,332, entitled CAMERA WITH ELECTROSTATIC LIGHT VALVE THAT FUNCTIONS AS DIAPHRAGM and filed Mar. 15, 2000 in the name of David R. Dowe, and Ser. No. 09/526,709, entitled CAMERA WITH ELECTROSTATIC LIGHT VALVE THAT FUNCTIONS AS VARIABLE FORMAT MASK IN VIEWFINDER and filed Mar. 15, 2000 in the name of David R. Dowe.

FIELD OF THE INVENTION

The invention relates generally to the field of photography, and in particular to cameras. More specifically, the invention relates to a camera with an electrostatic light valve (ELV) that functions as an image reflecting mirror for the viewfinder in the camera.

BACKGROUND OF THE INVENTION

Viewfinder

When taking a picture it is necessary to know not only in what direction to aim the camera, but also how much of the subject will be included in the picture. For this reason, practically every camera available today has a viewfinder of some kind.

The viewfinder of a single-lens reflex (SLR) camera is relatively complex. Typically, an objective or front taking lens forms an image of the subject (by focusing rays of light reflected from the subject) on a ground glass viewing screen in the viewfinder via a mirror. The mirror is normally positioned at a 45° angle between the front taking lens and a rear film plane to reflect the light rays from the taking lens to the ground glass screen, instead of allowing the light rays to reach the film plane. The image formed on the ground glass screen is right-side-up, but is reversed left-to-right. A roof pentaprism is placed just above the ground glass screen in the viewfinder to provide eye-level viewing of the image and to reverse the image to orient it correctly, right-to-left. When you look through a rear eye lens in the viewfinder, the image you see is substantially the same as will be exposed on a film frame at the film plane. Since the distance from the front taking lens to the ground glass screen is the same as the distance from the taking lens to the film plane, the image exposed on the film frame will be sharp when the image has been similarly focused on the screen. During exposure, the mirror is pivoted upward to the ground glass screen from its 45° position to permit the light rays from the front taking lens to reach the film plane.

Electrostatic Light Valve

An electrostatic light valve (ELV) consists of a transparent flat stationary electrode, a movable coil-biased resilient sheet electrode, and an insulating layer separating the two stationary and coilable electrodes. The coilable electrode has one end that is fixed with respect to the stationary electrode and a free end that is innermost within the coil when the coilable electrode is coiled. The coilable electrode is caused to unroll (uncurl) along the stationary electrode to overly the stationary electrode when an electric potential (voltage) is applied between the two electrodes. As long as the electric potential is applied, the coilable electrode remains unrolled along the stationary electrode. Conversely, when the electric potential is discontinued the coilable electrode is reversed along the stationary electrode to re-coil (re-curl). The coilable electrode can thus act as an electrostatically actuated light valve or light shutter. This is disclosed in prior art U.S. Pat. Nos. 4,248,501 issued Feb. 3, 1981, 4,704,707 issued Nov. 3, 1987, 5,233,459 issued Aug. 3, 1993 and 5,784,189 issued Jul. 21, 1998. The prior art patents are incorporated in this application.

THE CROSS-REFERENCED APPLICATIONS

Cross-referenced application Ser. No.09/526,332 discloses a camera with an electrostatic light valve (ELV) that functions as a diaphragm.

Cross-referenced application Ser. No. 09/526,709 discloses a camera with an electrostatic light valve (ELV) that functions as a variable format mask in a viewfinder.

SUMMARY OF THE INVENTION

According to one aspect of the invention, a camera generally comprising a lens for forming an image of a subject by focusing rays of light, and a mirror for a viewfinder which is movable in the way of the light rays from the lens to reflect the light rays and is movable out of the way of the light rays to allow the lens to focus the light rays without the mirror reflecting them, is characterized in that:

the movable mirror is constructed to curl into a coil to move out of the way of the light rays to not reflect them and to uncurl from said coil to be in the way of the light rays to reflect them.

According to another aspect of the invention, a method in a camera of moving a mirror for a viewfinder in the way of a rays of light from a lens to reflect the light rays and out of the way of the light rays to allow the lens to focus the light rays without the mirror reflecting them, is characterized by the steps of:

curling the mirror into a coil to move the mirror out of the way of the light rays to not reflect them; and uncurling the mirror from the coil to move the mirror in the way of the light rays to reflect them.

Preferably, the invention is embodied in a camera having an objective lens for forming an image of a subject by focusing rays of light on a film plane, and a mirror for a viewfinder which is movable in the way of the light rays between the objective lens and the film plane to reflect the light rays to a viewing screen in the viewfinder and is movable out of the way of the light rays to allow the lens to focus the light rays on the film plane. The movable mirror includes a transparent flat stationary electrode between the objective lens and the film plane, and a coilable mirrored resilient electrode having one end fixed with respect to the stationary electrode and a free end. The coilable electrode is biased to curl into a coil on the stationary electrode, beginning at the free end, to move out of the way of the light rays, and is electrostatically actuatable to uncurl from the coil along the stationary electrode to be in the way of the light rays to reflect them to the viewing screen.

Thus, the invention preferably incorporates an electrostatic light valve(ELV) in a camera to function as the image reflecting mirror for the viewfinder in the camera.

DETAILED DESCRIPTION OF THE INVENTION

The invention is disclosed as being embodied preferably in a single-lens reflex (SLR) camera, and includes an electrostatic light valve (ELV). Because the features of a SLR camera and an ELV are generally known, the description which follows is directed in particular only to those elements forming part of or cooperating directly with the disclosed embodiment. It is to be understood, however, that other elements may take various forms known to a person of ordinary skill in the art.

Figure 1:
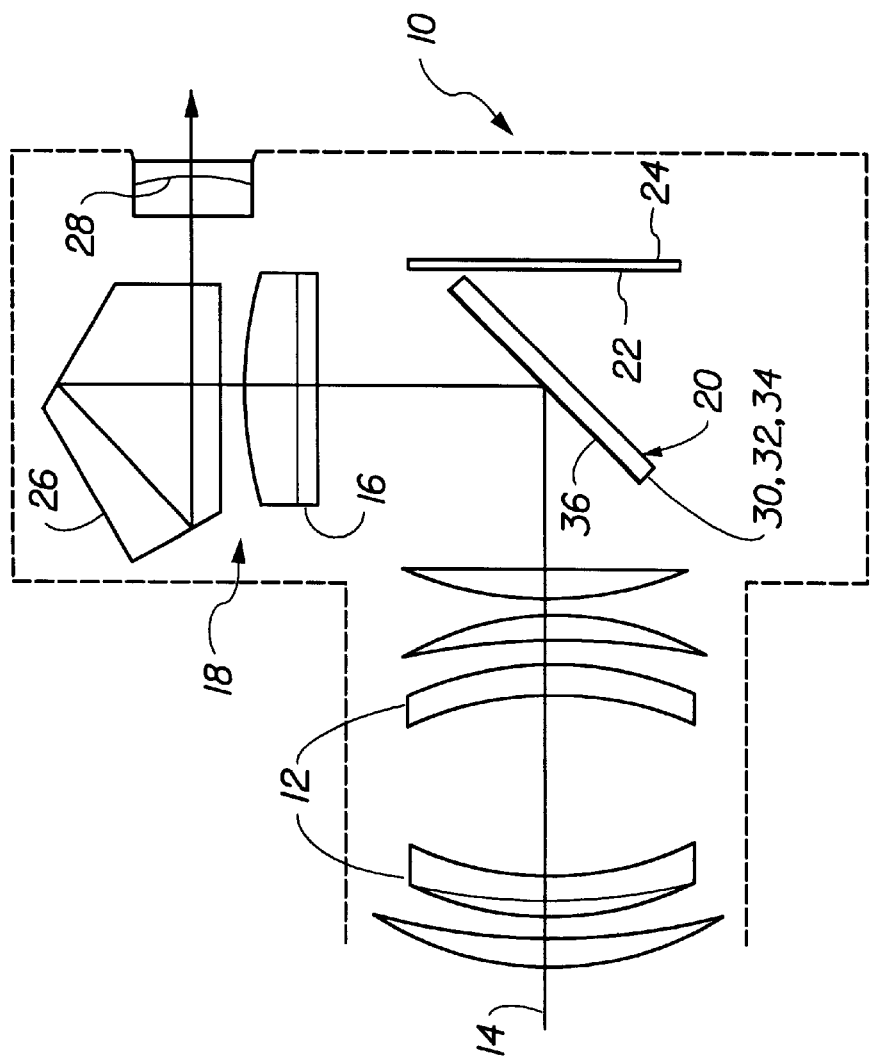
FIG. 1 is a side-elevation interior view of a camera with an electrostatic light valve (ELV) that functions as an image reflecting mirror for a viewfinder, in a preferred embodiment of the invention, showing a coilable mirrored electrode of the ELV uncoiled.
Figure 4:
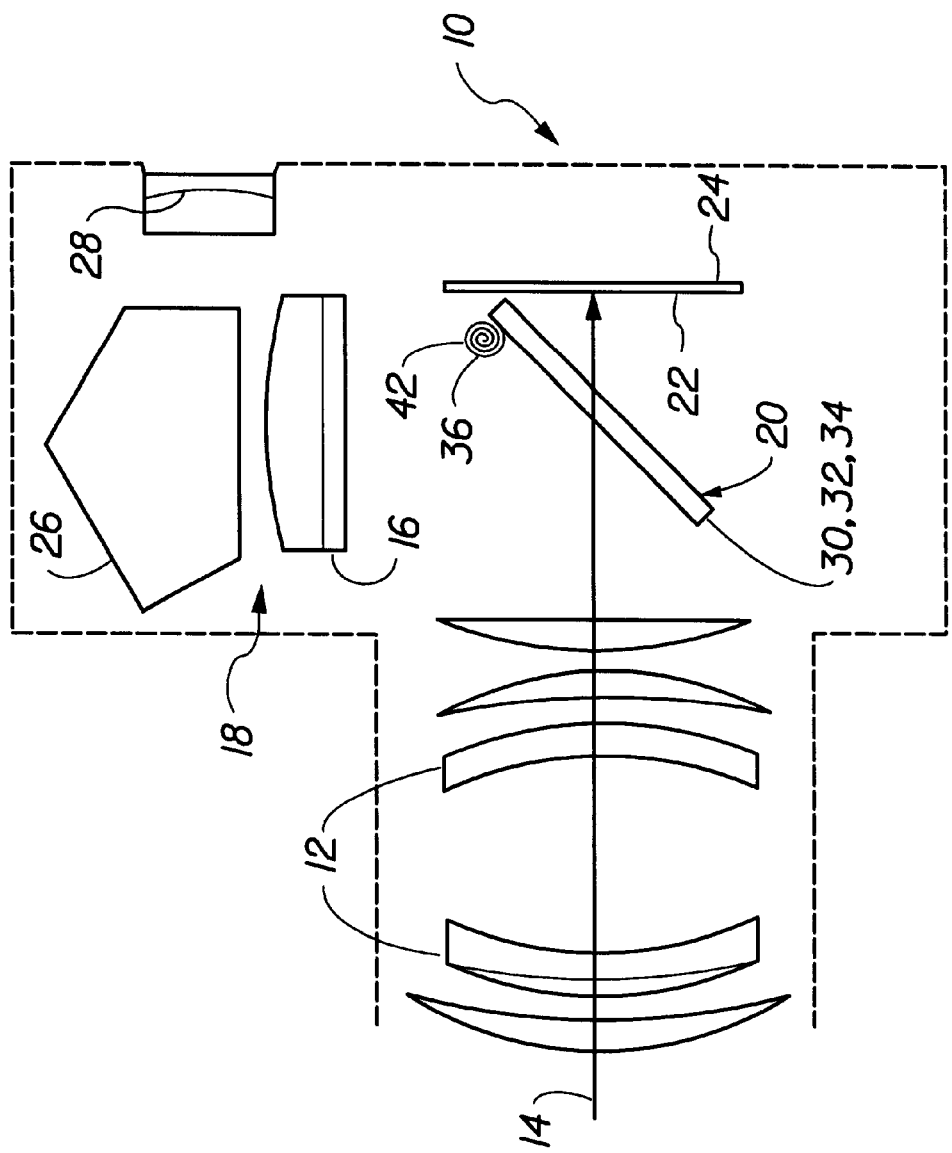
FIG. 4 is a side-elevation interior view of the camera, showing the coilable mirrored electrode coiled.

Referring now to the drawings, FIGS. 1 and 4 show an SLR camera 10 including a known-type objective or front taking lens 12 which forms an image of the subject (by focusing rays of light 14 reflected from the subject) on a known-type ground glass viewing screen 16 in a viewfinder 18, via a mirrored ELV 20. The ELV 20 is positioned at a 45° angle with respect to the objective lens 12 and the viewing screen 16. In FIG. 1, the ELV 20 operates between the objective lens 12 and the viewing screen 16 to reflect the light rays 14 from the objective lens to the viewing screen (instead of allowing the light rays to reach a film plane 22 defined by a known-type pressure platen 24). The image formed on the viewing screen 16 is right-side-up, but is reversed left-to-right. A known-type roof pentaprism 26 in the viewfinder 18 is placed just above the viewing screen 16 to provide eye-level viewing of the image and to reverse the image to orient it correctly, right-to-left. When you look through a known-type rear eye lens 28 in the viewfinder 18, the image you see is substantially the same as will be exposed on a film frame (not shown) at the film plane 22. Since the distance from the objective lens 12 to the viewing screen 16 is the same as the distance from the objective lens to the film plane 22, the image exposed on the film frame will be sharp when the image has been similarly focused on the viewing screen. During exposure, the ELV 20 operates between the objective lens 12 and the film plane 22 to permit the light rays 14 from the objective lens to reach the film plane. This is shown in FIG. 4.

Figure 2:
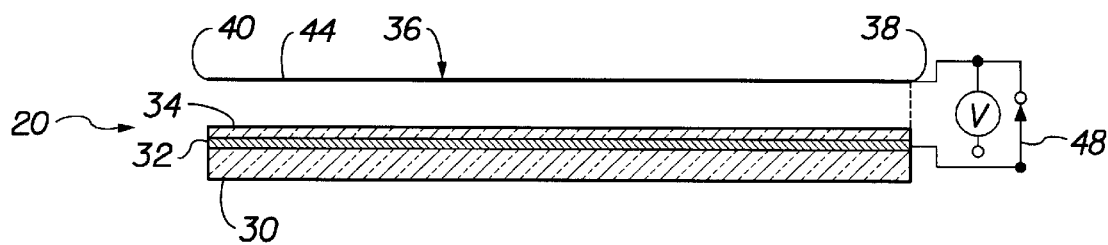
FIG. 2 is a partially assembled section view of the ELV, showing the coilable mirrored electrode uncoiled.
Figure 3:
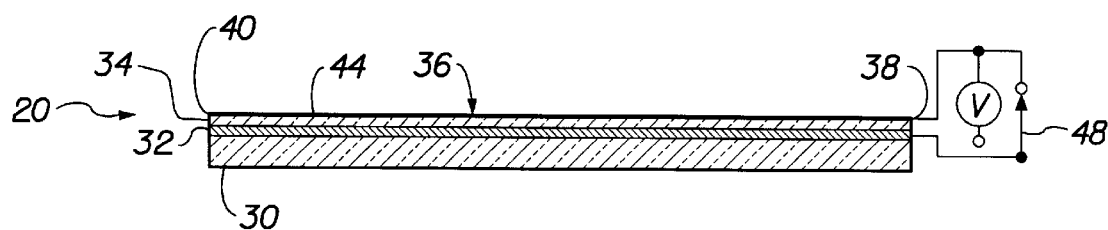
FIG. 3 is an assembled section view of the ELV similar to FIG. 2.
Figure 5:
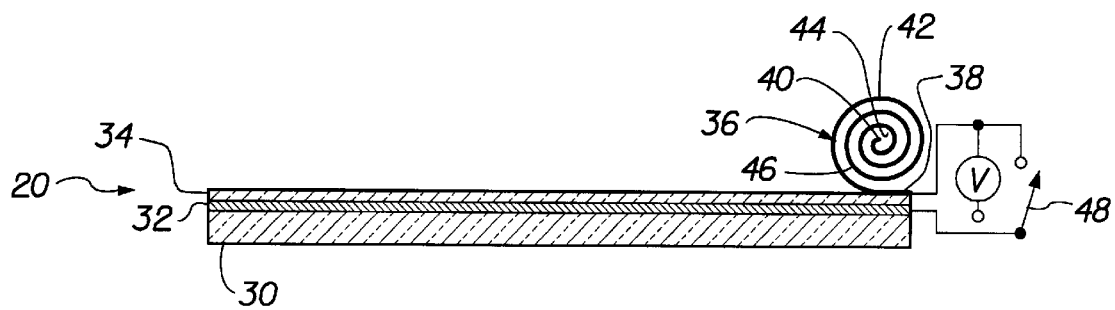
FIG. 5 is an assembled section view of the ELV, showing the coilable mirrored electrode coiled.

The ELV 20 as shown in FIGS. 2, 3, and 5 includes a transparent glass substrate 30 which is coated with a thin transparent conductive layer such as 1000–3000 Å indium tin oxide (ITO). The thin transparent conductive layer forms a transparent flat stationary electrode 32. A thin transparent insulative (high resistive) layer 34 such as 50–5000 Å silicon dioxide coats the stationary electrode 32. Further details of this assembly are disclosed in disclosed in prior art U.S. Pat. Nos. 5,233,459 issued Aug. 3, 1993 and 5,784,189 issued Jul. 21, 1998. A coilable mirrored resilient electrode 36 has one end 38 fixed with respect to the stationary electrode 32 and a free end 40. The coilable electrode 36 is biased to curl into a coil 42 on the stationary electrode 32, beginning at the free end 40 as shown in FIG. 5, and is electrostatically actuatable to uncurl (unroll) from the coil along the stationary electrode to overly the stationary electrode as shown in FIG. 3. A mirrored resilient surface 44 on the coilable electrode 36 is a curved inner surface along the successive convolutions 46 of the coil 42 when the coilable electrode is curled into the coil as shown in FIG. 5, and is a flat outer surface when the coilable electrode is uncurled from the coil as shown in FIG. 3. An electric potential V (voltage) is connected across the stationary electrode 32 and the coilable electrode 36, when a normally open switch 48 is closed, to electrostatically actuate the coilable electrode to uncurl from the coil 42. As long as the switch 48 is closed, the electric potential V is applied to keep the coilable electrode 36 uncoiled. Opening the switch 48 discontinues the electric potential V, which allows the restitution force of the coilable electrode 36 to re-curl the coilable electrode into the coil 42. This is described in prior art U.S. Pat. No. 4,248,501 issued Feb. 3, 1981.

A method of operating the ELV 20 in the SLR camera 10 is as follows. Before making an exposure, the switch 48 is closed to apply the electric potential V to the stationary electrode 32 and the coilable electrode 36. The coilable electrode 36 then uncurls from the coil 42 to overly the stationary electrode as shown in FIG. 1, to reflect the light rays 14 from the objective lens 12 to the viewing screen 16. Thus, an image of the subject can be seen at the eye lens 28 in the viewfinder 18 to compose the picture. When a known-type release button (not shown) is manually depressed to initiate the exposure, the switch 48 is opened to discontinue the electric potential V. The coilable electrode 36 then re-curls into the coil 42 to substantially uncover the stationary electrode 32 as shown in FIG. 4. This permits the light rays 14 from the objective lens 12 to reach the film plane 22 to effect the exposure when a known-type shutter (not shown) is opened.

The invention has been described with reference to a preferred embodiment. However, it will be appreciated that variations and modifications can be effected by a person of ordinary skill in the art without departing from the scope of the invention.

PARTS LIST

10. SLR camera
12. objective lens
14. light rays
16. viewing screen
18. viewfinder
20. ELV
22. film plane
24. pressure platen
26. roof pentaprism
28. eye lens
30. transparent glass substrate
32. stationary electrode
34. transparent insulative layer
36. coilable electrode
38. fixed end
40. free end
42. coil
44. mirrored surface
46. successive convolutions
48. switch
V. electric potential

What is claimed is:

1. A camera comprising a lens for forming an image of a subject by focusing rays of light, and a mirror for a viewfinder which is movable in the way of the light rays from said lens to reflect the light rays and is movable out of the way of the light rays to allow said lens to focus the light rays without said mirror reflecting them, is characterized in that:

said movable mirror is constructed to curl into a coil to move out of the way of the light rays to not reflect them and to uncurl from said coil to be in the way of the light rays to reflect them.

2. A camera as recited in claim 1, wherein said movable mirror includes a coilable resilient electrode that is biased to curl into said coil and is electrostatically actuatable to uncurl from the coil.

3. A camera as recited in claim 2, wherein said coilable electrode has a mirrored resilient surface that is a curved inner surface along at least one convolution of said coil when the coilable electrode is curled into the coil and is a flat outer surface which is tilted towards said lens when the coilable electrode is uncurled from the coil.

4. A camera as recited in claim 2, wherein said movable mirror includes a transparent flat stationary electrode that is positioned parallel to said coilable electrode when the coilable electrode is uncurled from said coil.

5. A camera as recited in claim 4, wherein said stationary electrode is angled 45° facing said lens.

6. A method in a camera of moving a mirror for a viewfinder in the way of rays of light from a lens to reflect the light rays and out of the way of the light rays to allow the lens to focus the light rays without the mirror reflecting them, is characterized by the steps of:
  curling the mirror into a coil to move the mirror out of the way of the light rays to not reflect them; and
  uncurling the mirror from the coil to move the mirror in the way of the light rays to reflect them.

7. A method as recited in claim 6, wherein the step of uncurling the mirror from the coil includes electrostatically actuating a coilable mirrored resilient electrode biased to curl into the coil, in order to uncurl the coilable mirrored electrode from the coil.

8. A method as recited in claim 6, wherein the step of uncurling the mirror from the coil includes applying an electric potential between a transparent flat stationary electrode angled 45° facing the lens and a coilable mirrored resilient electrode biased to curl into the coil, in order to electrostatically actuate the coilable mirrored electrode to uncurl from the coil along the stationary electrode to be similarly angled facing the lens.

9. A camera comprising an objective lens for forming an image of a subject by focusing rays of light on a film plane, and a mirror for a viewfinder which is movable in the way of the light rays between said objective lens and said film plane to reflect the light rays to a viewing screen in said viewfinder and is movable out of the way of the light rays to allow said lens to focus the light rays on said film plane, is characterized in that:
  said movable mirror includes a transparent flat stationary electrode between said objective lens and said film plane, and a coilable mirrored resilient electrode having one end fixed with respect to said stationary electrode and a free end;
  said coilable electrode is biased to curl into a coil on said stationary electrode, beginning at said free end, to move out of the way of the light rays, and is electrostatically actuatable to uncurl from said coil along said stationary electrode to be in the way of the light rays to reflect them to said viewing screen.

* * * * *